United States Patent
St-Yves et al.

(10) Patent No.: US 8,944,466 B2
(45) Date of Patent: Feb. 3, 2015

(54) VEHICLE OUTRIGGER AND STABILIZED VEHICLE USING SAME

(75) Inventors: Jean-Francois St-Yves, Victoriaville (CA); Sylvain Pelchat, Victoriaville (CA)

(73) Assignee: Posi-Plus Technologies Inc., Victoriaville (CA)

(*) Notice: Subject to any disclaimer, the term of this patent is extended or adjusted under 35 U.S.C. 154(b) by 184 days.

(21) Appl. No.: 13/449,696

(22) Filed: Apr. 18, 2012

(65) Prior Publication Data

US 2012/0261213 A1 Oct. 18, 2012

Related U.S. Application Data

(60) Provisional application No. 61/476,351, filed on Apr. 18, 2011.

(51) Int. Cl.
*B60S 9/12* (2006.01)
*B66C 23/80* (2006.01)
*E06C 5/04* (2006.01)
*E02F 9/08* (2006.01)

(52) U.S. Cl.
CPC .. *B60S 9/12* (2013.01); *E02F 9/085* (2013.01); *B66C 23/80* (2013.01); *E06C 5/04* (2013.01)
USPC .......... 280/763.1; 182/17; 248/351; 248/157; 248/188.8

(58) Field of Classification Search
CPC ............. B60S 9/10; B60S 9/12; B66C 23/80; E02F 9/08; E02F 9/085; E04G 21/04
USPC ........ 280/763.1, 764.1, 765.1, 766.1; 182/17, 182/200; 248/351, 354.1, 157, 161, 411, 248/188.2, 188.8, 188.91

See application file for complete search history.

(56) References Cited

U.S. PATENT DOCUMENTS

| | | | |
|---|---|---|---|
| 3,007,717 A | 11/1961 | Noly | |
| 3,175,698 A | 3/1965 | Dassler | |
| 3,253,717 A * | 5/1966 | Krynytzky | 212/304 |
| 3,262,582 A | 7/1966 | Pitman et al. | |
| 3,279,622 A * | 10/1966 | Person | 212/304 |
| 3,716,252 A | 2/1973 | Johnson | |
| 3,801,068 A | 4/1974 | Kopas | |
| 3,857,582 A | 12/1974 | Hartog | |
| 3,871,685 A | 3/1975 | Senelet | |
| 3,909,040 A * | 9/1975 | Visser | 280/765.1 |

(Continued)

FOREIGN PATENT DOCUMENTS

FR 2 498 140 A1 7/1982
WO 01/09537 A1 1/2011

*Primary Examiner* — Karen Beck
(74) *Attorney, Agent, or Firm* — Goudreau Gage Dubuc; Hugh Mansfield (57) ABSTRACT

An outrigger is disclosed for stabilizing a wheeled vehicle having an extensible service equipment mounted to a chassis thereof. The outrigger is deployable between a stowed and a deployed position where a foot of a telescopic leg assembly comes into contact with the ground thus stabilizing the vehicle. The telescopic leg assembly is mounted to the chassis of the vehicle such that travel of the foot is initially in a horizontal direction with no downward component followed subsequently by travel in a substantially vertical direction with limited horizontal movement such that when the foot comes into contact with the ground, lateral forces are limited. There is also disclosed a stabilized wheeled vehicle comprising opposed pairs of outriggers.

7 Claims, 6 Drawing Sheets

(56) References Cited

U.S. PATENT DOCUMENTS

| | | | | |
|---|---|---|---|---|
| 3,912,289 | A | 10/1975 | Czajkowski, Jr. | |
| 3,945,666 | A | 3/1976 | Fritsch | |
| 4,084,777 | A | 4/1978 | Lambert | |
| 4,116,467 | A | 9/1978 | Ewert | |
| 4,118,054 | A * | 10/1978 | Vigerie | 280/765.1 |
| 4,236,643 | A | 12/1980 | Schmitz | |
| 4,295,661 | A | 10/1981 | Maurer | |
| 4,518,046 | A * | 5/1985 | Rettig et al. | 172/311 |
| 4,593,932 | A | 6/1986 | Miyazawa | |
| 4,865,295 | A | 9/1989 | Holloway | |
| 4,949,808 | A * | 8/1990 | Garnett | 182/17 |
| 5,067,739 | A | 11/1991 | Kuan | |
| 5,335,891 | A * | 8/1994 | Gibert | 248/354.1 |
| 5,387,071 | A | 2/1995 | Pinkston | |
| 5,398,969 | A | 3/1995 | Wimmer | |
| 5,826,889 | A | 10/1998 | Eden | |
| 5,899,496 | A | 5/1999 | Muraro | |
| 6,138,845 | A * | 10/2000 | Kaspar | 212/302 |
| 6,202,013 | B1 * | 3/2001 | Anderson et al. | 701/50 |
| 6,516,917 | B1 * | 2/2003 | Mayer et al. | 182/17 |
| 7,331,607 | B1 * | 2/2008 | Schneider | 280/766.1 |
| 7,594,679 | B1 * | 9/2009 | Schneider | 280/766.1 |
| 7,683,564 | B2 * | 3/2010 | Harris et al. | 318/565 |
| 8,657,335 | B2 * | 2/2014 | Borghi | 280/765.1 |
| 2007/0284866 | A1 | 12/2007 | Hanson | |
| 2012/0261213 | A1 * | 10/2012 | St-Yves et al. | 182/64.1 |
| 2013/0009385 | A1 * | 1/2013 | Vlahakis | 280/475 |

* cited by examiner

VEHICLE OUTRIGGER AND STABILIZED VEHICLE USING SAME

CROSS REFERENCE TO RELATED APPLICATIONS

This application claims benefit under 35 U.S.C. §119(e), of U.S. provisional application Ser. No. 61/476,351, filed on Apr. 18, 2011. All documents above are incorporated herein in their entirety by reference.

FIELD OF THE INVENTION

The present invention relates to an outrigger for stabilizing a vehicle. In particular, the present invention relates to a telescoping outrigger for a vehicle that provides a retractable leg capable of engaging the ground at a substantially normal angle of attack.

BACKGROUND OF THE INVENTION

The prior art reveals a plurality of outrigger structures for stabilizing a vehicle comprising one or more pairs of retractable legs designed to engage the surrounding ground to provide a wider base of support for the vehicle. Many of these outriggers comprise hydraulically activated structures which actuate a leg for swinging engagement with the surrounding ground. However, such configurations comprise leg members which, upon engagement with the ground, result in large stress and bending moments on the leg members and which expose the hydraulic actuator to damage from the surrounding environment. Additionally, outriggers comprising oppositely positioned legs tend to work against each other during their deployment as the angles of attack of the legs upon the ground create horizontal forces. As a result, the hydraulic forces required to engage the leg with the ground is partly used to counteract these horizontal forces generated by an oppositely positioned outrigger instead of being directed for lifting and stabilizing the vehicle in a substantially vertical direction, which typically requires reinforcement of the legs.

To overcome these and other drawbacks, some outriggers use telescoping legs housing hydraulic actuators which extend and retract the leg for engagement with the ground or for storage and which also protect the hydraulics from damage. Additionally, some outriggers comprise legs which attack the ground at right angles which reduces any bending forces applied on leg members. Still, in these prior art outriggers additional structural members are required to extend the leg away from a vehicle's body to allow the leg to sufficiently engage the ground at a position to provide a wide base of support. One major drawback of such outriggers is that the additional components increase the weight and cost of the outrigger and vehicle. Moreover, outriggers which provide a simpler structure comprising a pivotable telescopic leg member still engage the ground at angles that create moments on the leg member and which do not lift the vehicle in a substantially vertical direction. Additionally, the positions of the foot within which the vehicle will remain stable is limited.

SUMMARY OF THE INVENTION

In order to address the above and other drawbacks, there is provided an outrigger for stabilizing a wheeled service vehicle comprising a chassis by engaging ground on which the vehicle is standing. The outrigger comprises a telescopic leg assembly comprising a first telescopic member and a second telescopic member slidably overlapping and extending outwardly from the first telescopic member along a longitudinal axis, an actuator housed within the telescopic leg assembly for slidably extending or retracting the first telescopic member versus the second telescopic member along the longitudinal axis, a footing at an outer end of the second telescopic member, a mounting bracket for connection to the chassis comprising an upper mounting point and a lower mounting point offset horizontally from the upper mounting point, a first flange extending from the first telescopic member and pivotally mounted to the upper mounting point at a point offset from the longitudinal axis, and an elongate linkage pivotally attached between the lower horizontally offset mounting point and the second telescopic member. When the telescopic leg is extended from a stowed position to a deployed position, the foot follows a path comprising an initial extending part comprising a horizontal component and no downward component followed by a subsequent ground engagement part wherein the foot engages the ground while moving downwards at an angle substantially normal to the ground.

There is also provided a stabilized wheeled service vehicle comprising a chassis, an extendable servicing equipment attached to an upper surface of the chassis via a rotatable turntable, a system of actuators for raising, lowering, extending and rotating the telescoping boom, and at least one pair of independently extendable outriggers, each outrigger of the pair mounted on a respective side of the chassis in an opposed relationship, each outrigger comprising a telescopic leg assembly comprising a first telescopic member and a second telescopic member slidably overlapping and extending outwardly from the first telescopic member along a longitudinal axis, an actuator housed within the telescopic leg assembly for slidably extending or retracting the first telescopic member versus the second telescopic member along the longitudinal axis, a footing at an outer end of the second telescopic member, a mounting bracket for connection to the frame comprising an upper mounting point and a lower mounting point offset horizontally from the upper mounting point, a first flange extending from the first telescopic member and pivotally mounted to the upper mounting point at a point offset from the longitudinal axis and an elongate linkage pivotally attached between the lower horizontally offset mounting point and the second telescopic member. When the telescopic leg is extended away from the chassis, the foot follows a path comprising an initial extending part comprising a horizontal component and no downward component followed by a subsequent ground engagement part wherein the foot engages the ground while moving downwards at a substantially normal angle.

DETAILED DESCRIPTION OF THE ILLUSTRATIVE EMBODIMENTS

Figure 1:
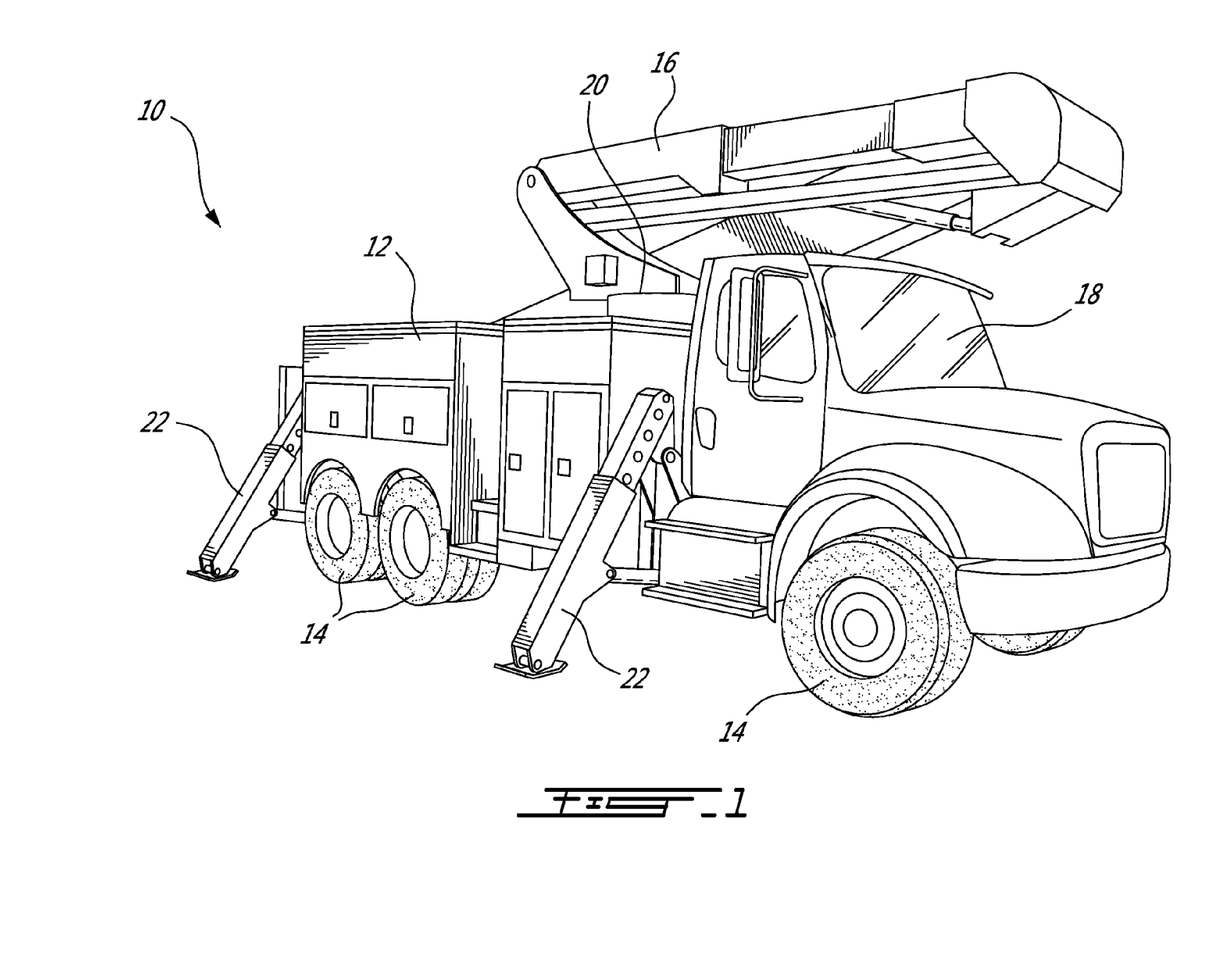
FIG. 1 is a left front perspective view of a stabilized wheeled vehicle equipped with a plurality of opposed outriggers and in accordance with an illustrative embodiment of the present invention.

Referring now to FIG. 1, a stabilized vehicle, generally referred to using the reference numeral 10, will now be described. The vehicle 10, illustratively in the form of a bucket truck, comprises a chassis (or frame) 12 supported on a plurality of wheels 14, or tracks or the like. An extendable servicing equipment 16, for example a telescoping boom, an aerial work platform, an articulated boom lift, crane, basket crane or hydraladder, is illustratively supported on the chassis 12. A cab 18 is provided for accommodating an operator when moving the vehicle 10. The servicing equipment 16 comprises a bucket (not shown) for transporting an operator at a distal end thereof and is illustratively mounted on a rotatable turntable 20 allowing the extendable servicing equipment 16 and bucket to be rotated vis-à-vis the chassis 12. As raising and extending the extendable servicing equipment 16 may destabilize the vehicle 10 and in the worst case cause the vehicle 10 to tip over, a plurality of extendable outriggers as in 22 are provided. When in an extended position the outriggers 22 provide the vehicle 10 with a wider base of support. Generally, a wider base of support is preferable when the vehicle 10 comprises an extendable servicing equipment 16, crane, ladder, or the like which increases the center of gravity of the vehicle 10 tending to generate a tipping moment about the vehicle 10.

Figure 2:
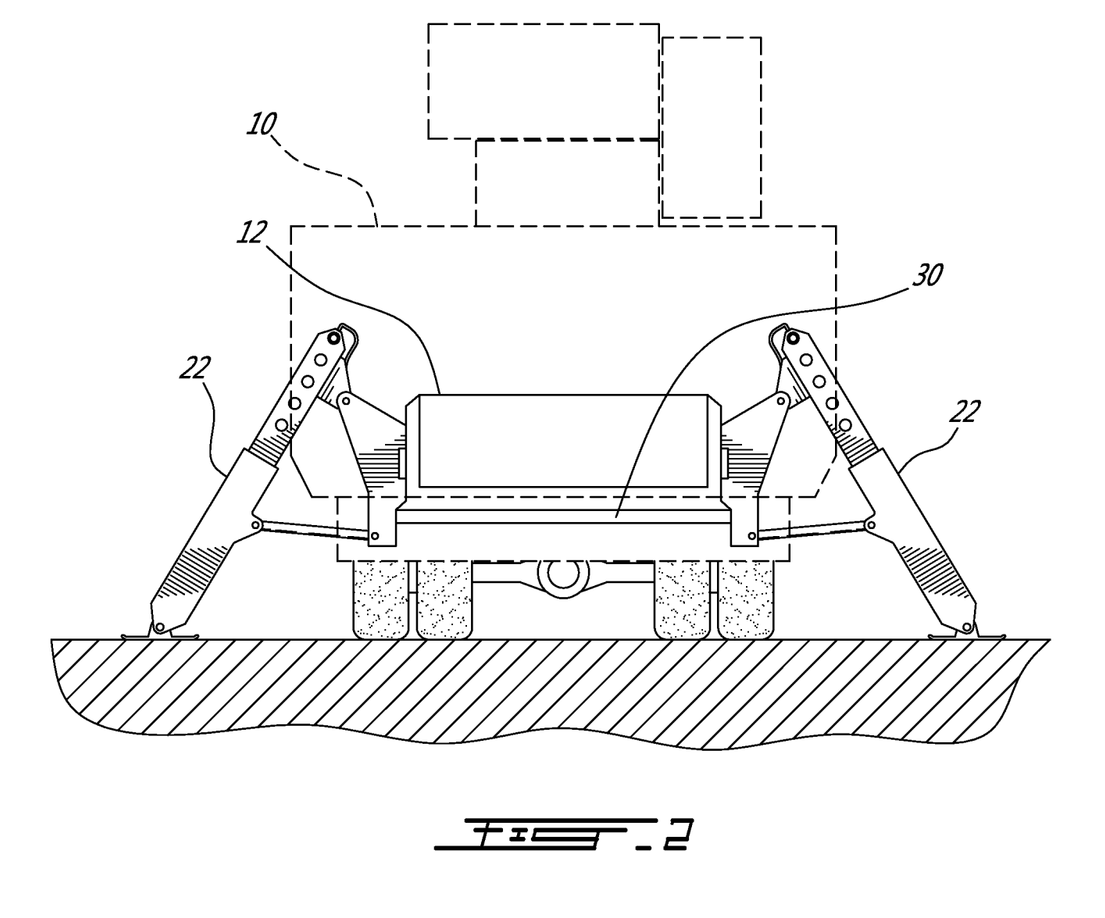
FIG. 2 is a partially cut away rear plan view of the stabilized wheeled vehicle of FIG. 1.

Referring to FIG. 2 in addition FIG. 1, outriggers as in 22 are illustratively paired with other outriggers 22 positioned on an opposite side of the vehicle chassis 12 in an opposed relationship, and which are generally paired at the rear, middle, and/or front section thereof in order to stabilize the vehicle from tipping moments generated by the extendable servicing equipment 16 attached to the vehicle 10. When not in operation, the outrigger 22 is able to be retracted towards the sides of the vehicle 10 to provide a low profile and a ground clearance to facilitate movement of the wheeled service vehicle 10. Of note is, notwithstanding that the outriggers 22 are typically paired, each of the outriggers of a given pair is independently extendable, providing therefore that the outrigger(s) as in 22 on one side of the vehicle 10 may be extended while those on the other side of the vehicle remain retracted, or extended more or less to accommodate obstacles and uneven terrain and the like.

Figure 3:
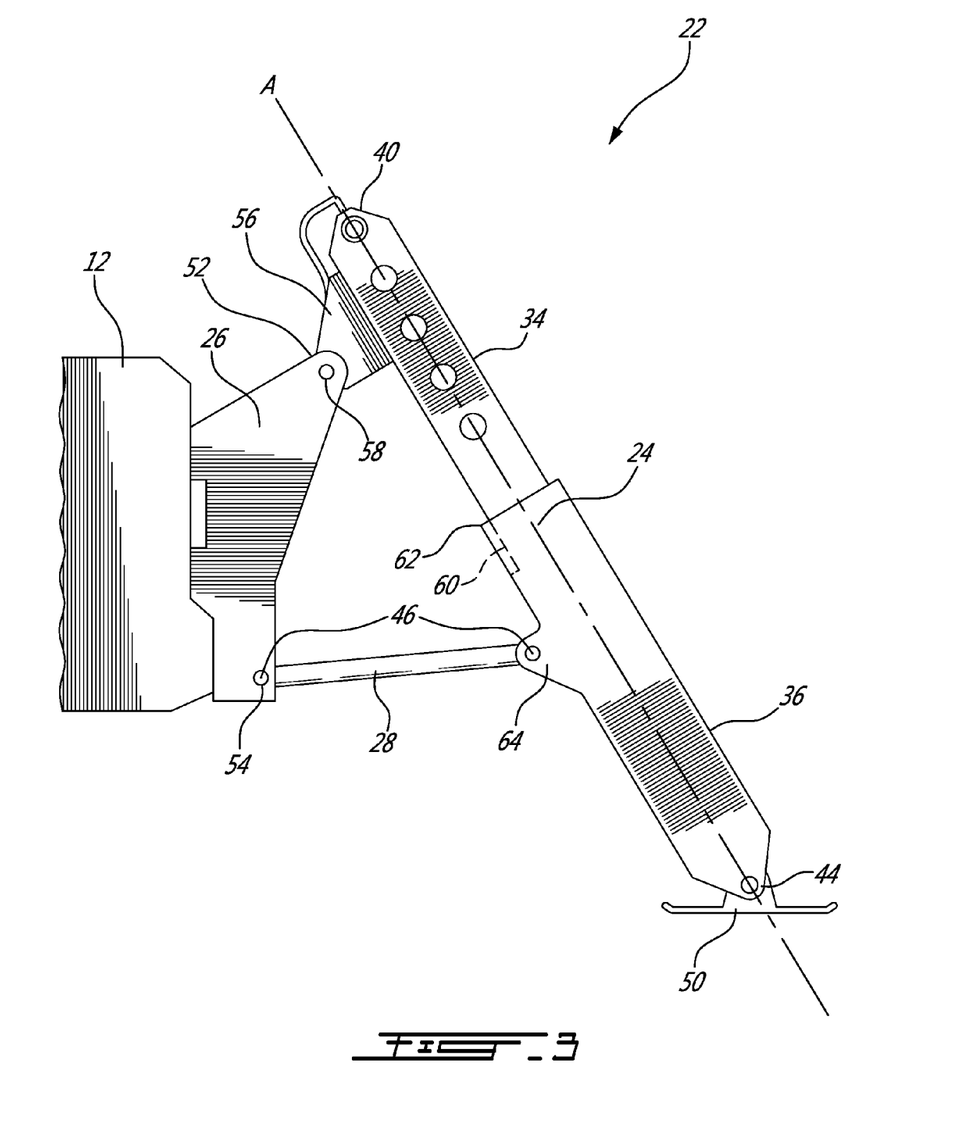
FIG. 3 is a side view of an outrigger in a deployed position, in accordance with an illustrative embodiment of the present invention.

Referring to FIG. 3, the outrigger 22 comprises a telescoping leg 24, a mounting bracket 26 for securing the telescoping leg 24 to the chassis 12, and a guide member 28 for guiding the telescoping leg 24 between a stored or stowed position to a deployed or ground engaging position and for providing structural support to the outrigger 22 when deployed, as will be described hereinbelow.

Still referring to FIG. 3, the mounting bracket 26 secures the outrigger 22 to the vehicle, illustratively, at a point on the vehicle chassis 12 by welding, bolting, or the like, or a combination thereof. The mounting bracket 26 is manufactured from high strength steel or the like to resist any deformation or twisting moments caused by the operation of the outrigger 22 and may either be formed as a solid piece or may be formed by bracing two high strength steel plates together for weight reduction while maintaining structural strength. As discussed above, the outrigger 22 is generally paired with a second outrigger 22 at a mounting point on the chassis 12 at a position on the opposite side of the vehicle to further extend the base of support of the vehicle and to counteract tipping moments about either sides of the vehicle. Of note, and with reference back to FIG. 2, oppositely paired outriggers 22 may comprise torsion elements 30 running underneath or through the vehicle to connect the outriggers 10 together to help reduce any torsion moments and stresses on the chassis 12. Additionally, while one single mounting bracket 26 has been illustrated, multiple brackets may also be used for securing the telescoping leg 24 to the chassis 12.

Figure 4:
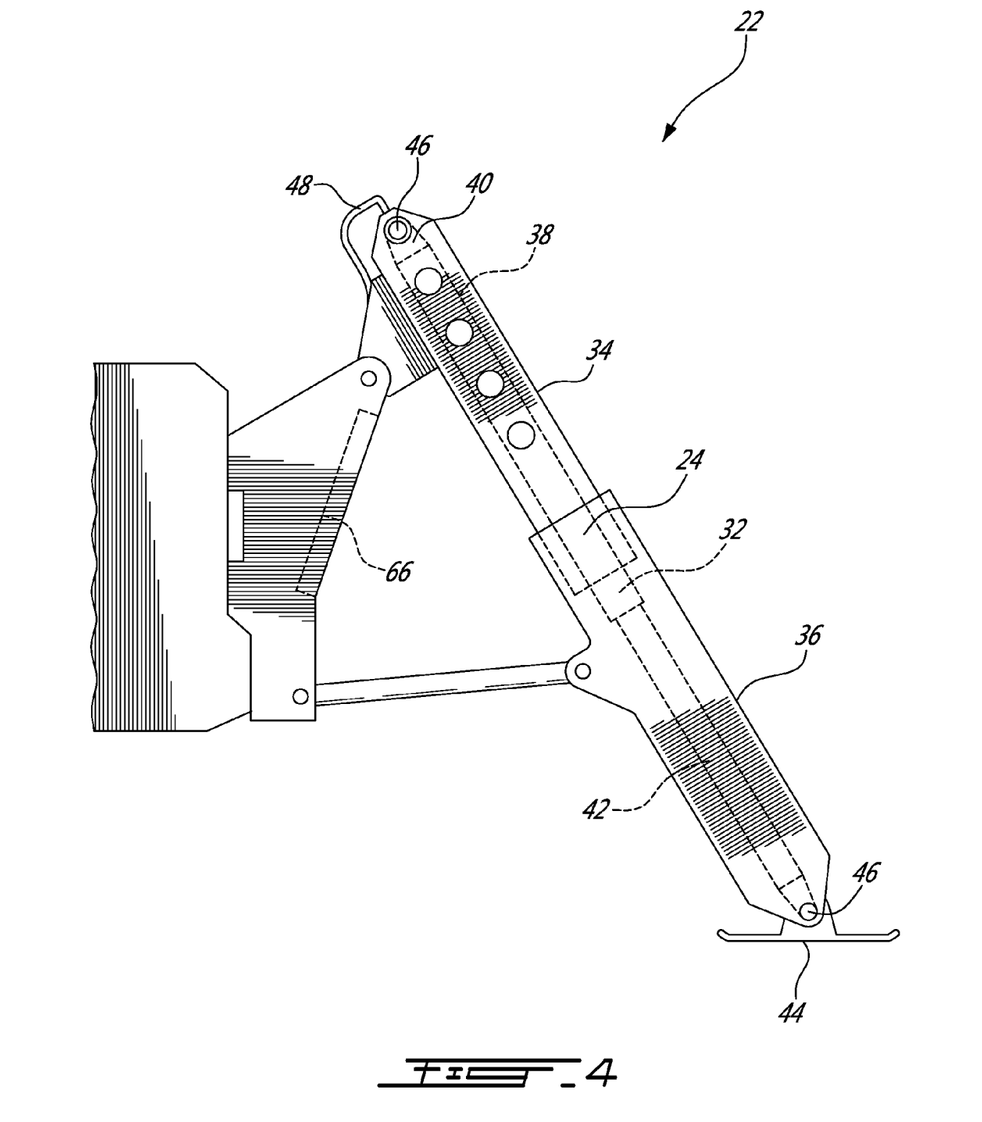
FIG. 4 is a side view of the outrigger of FIG. 3 illustrating the actuator housed within the telescopic leg.

Now referring to FIG. 4, in addition to FIG. 3, the telescopic leg 24 illustratively comprises a two telescopic member configuration formed from high strength steel which are extended and retracted relative to one another by an actuator 32 housed therein. Illustratively, there is provided a single action telescopic leg 24 comprising two telescopic members comprising a first stage tube member 34, and a second stage tube member 36, having a larger diameter such that the first stage tube 34 is able to be nested within the second tube 34 during extraction and retraction of the telescopic leg 24. Housed within the telescopic leg 24 is the actuator 32, such as a hydraulic actuator or the like, which provides the necessary force and travel to both extend and retract the telescopic members 34, 36 relative to one another. Illustratively, the actuator 32 may provide 3000 psi of hydraulic pressure which can be used to prop and support the vehicle off of the ground if necessary after the telescopic leg 24 engages the ground. Of note, while the telescopic leg 24 has illustratively been shown to comprise two telescopic stages, additional stages of the telescopic leg 24 comprising nested members may be also provided for. Additionally, various cross-sectional geometries of the telescopic members may be provided, such as a square or circular cross section.

Still referring to FIG. 3 and FIG. 4, a cylinder 38 of the actuator 32 is illustratively mounted to the first stage member 34 at a top portion 40 thereof, and a piston 42 of the actuator 32 is mounted at a base 44 of the second stage member 36. Illustratively the piston 42 and the cylinder 38 of the actuator 32 may be mounted to the second stage member 36 and the first stage member 34, respectively, by providing a pin bracket configuration as in 46 for engaging holes in the sides of the telescopic leg 24 and the actuator 32. Flanges, trunnions and/or clevises may also be incorporated with the cylinder 38 and piston rod 42 for connecting to the first stage member 34 and second stage member 36 and for translating the actuation forces for pushing or pulling the members 34, 36 together or apart. The actuator 32 receives hydraulic fluid (not shown) such as oil from pressurized lines 48 received at the top 40 of the first stage member 34 which are pressurized by a hydraulic pump or the like (not shown) forming part of a hydraulic system located on the vehicle. When the hydraulic actuator 32 is operated, the displacement of the piston 42 relative to the cylinder 38 causes the first stage member 34 and the second stage member 36 to telescopically extend or retract.

Still referring to FIG. 3, there is further provided a ground engaging foot 50 which is attached to the base 44 of the second stage member 36 for providing a wider area of contact for the telescoping leg 24 to engage the ground with. Illustratively, the foot 50 may be comprised of a steel plate having a rubberized pad for providing traction or other configurations which are generally known in the art for outrigger footings. Of note, the foot 50 may be pivotally attached to the base 44 for providing a maximum surface contact area of the foot 50 with the ground should the ground be uneven.

Still referring to FIG. 3, the telescopic leg 24 is connected to the mounting bracket 26 at an upper mounting point 52 of the mounting bracket 26 and at a lower mounting point 54 of the mounting bracket 26 via the guide member 28. The upper mounting point 52 comprises a first flange 56 illustratively connected to the inner side of the first stage member 34 facing the mounting support 26 at its top 40. This first flange 56 is pivotally mounted to the mounting bracket 26 by a pivot pin 58 configuration for providing a pivoting motion of the telescoping leg 24 about this point. This upper mounting point 52 configuration provides a point of rotation for the telescoping leg 24 that is offset from its longitudinal central axis A. In addition, this first flange 56 provides a mounting point to the telescoping leg 24 which allows a shorter and smaller bracket 26 to be used. Of note, to ensure a maximum range of telescoping action of the telescoping leg 24 by reducing the interference of the first flange 56 with the second stage member 36 as it is nested over the first stage member 34, the second stage member 36 illustratively comprises a cutout portion 60 at the upper part 62 of the second stage member 36 which accommodates the first flange 56 when the second stage member 36 is fully retracted over the first stage member 34.

Referring again to both FIG. 3 and FIG. 4, as discussed above the outrigger 22 further comprises the guide member 28 which is pivotally mounted to the second stage member 36 via an inwardly extending second flange 64 at a point approximately mid-point of the length of the second stage member 36. Illustratively, the guide member 28 is pivotally mounted to the mounting bracket 26 at the lower mounting point 54 and the second stage member 36 by a pin bracket configuration as in 46. As will now be apparent to a person of ordinary skill in the art, as the telescopic leg 24 extends and retracts, the guide member 28 controls the rotation of the telescopic leg 24 about the upper mounting point 52.

Figure 5:
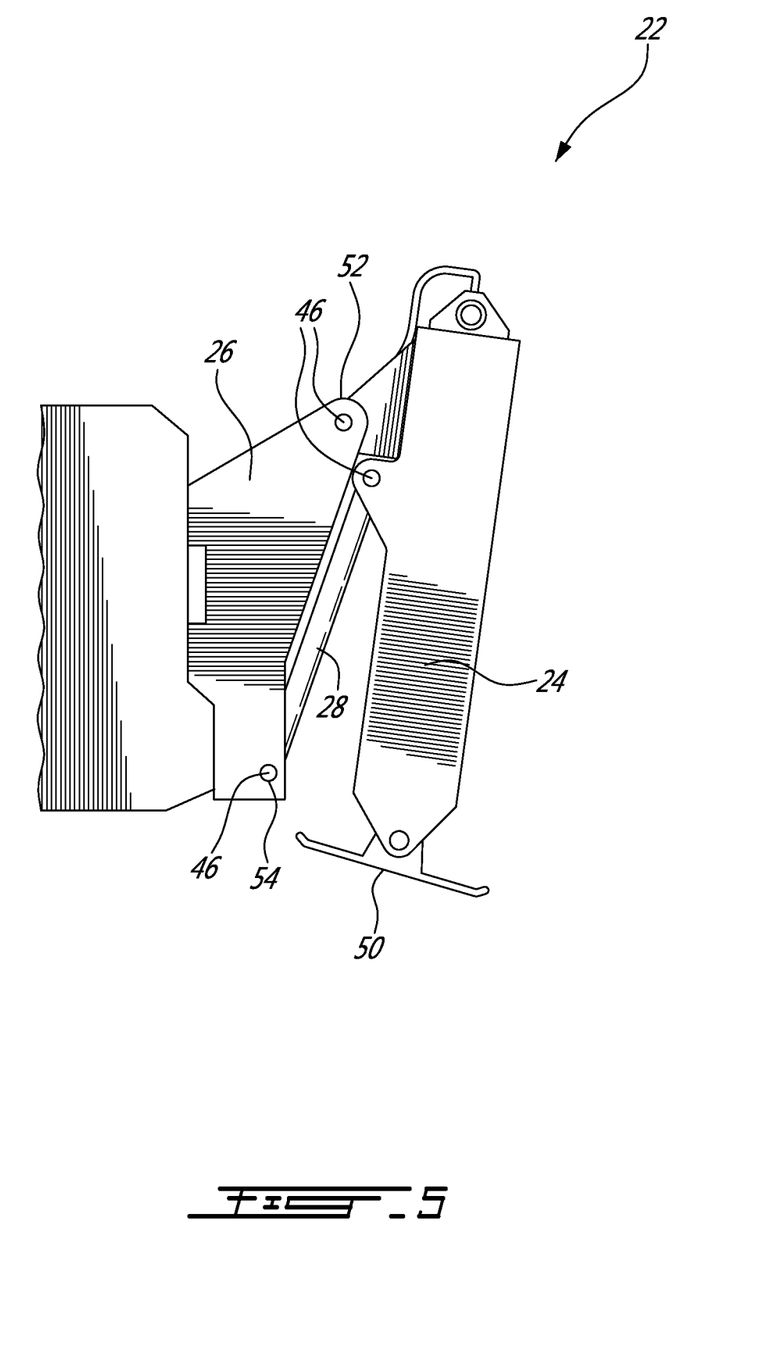
FIG. 5 is a side view of the outrigger of FIG. 3 illustrating the outrigger in a stored position.

Referring now to FIG. 5, in addition to FIG. 3 and FIG. 4, the operation of the outrigger 22 will now be described. The telescoping leg 24 is illustratively extended from a stowed or stored position of FIG. 5, used for transportation and movement of the vehicle and the like, to the deployed position of FIG. 3, wherein the telescoping leg 24 engages the ground for providing a wider base of support for the vehicle and for stabilization. In the stored position, the first stage member 34 is fully nested within the second stage member 36 and the telescopic leg 24 is brought into substantially parallel position with the mounting bracket 26 and the side of the vehicle. To facilitate a low profile stored position, there is illustratively provided a compartment 66 formed within the mounting bracket 26 capable of partly or fully receiving the guide member 28 and the inwardly extending flange therein to enable the telescoping leg 24 to closely approach the mounting bracket 26. In such a stored position the foot 50 is disengaged from the ground and the outrigger 22 provides a minimum protrusion from the sides of the vehicle and a sufficient ground clearance for vehicle movement. Upon activation of the actuator 32, the first stage member 34 and the second stage member 36 are extended from their nested positions relative to one another in a direction along the longitudinal axis of the telescopic leg 24. As the second stage member 36 is extended from the first stage member 34 the guide member 28 begins to follow the vertical movement of the second stage member 36 and in doing so forces the second stage member 36 to move horizontally outwards away from the mounting bracket 26 as the guide member 28 swings about the lower mounting point 54 in an arc defined by its length. As the second stage member 36 is horizontally displaced from its stored position to its deployed position by the guide member 28 and the actuation of the actuator 32, the telescopic leg 24 pivots about the upper mounting point 52 thereby changing the angle of attack of the telescopic leg 24 relative to the ground. As will now be apparent to a person of skill in the art, as the actuator 32 is extended and the guide member 28 swings about the lower mounting point 54, the telescopic leg 24 initially rotates about the upper mounting point 52 in a counter clockwise direction such that a height of the foot 50 above the ground, and to which the actuator 32 is attached, increases, significantly reducing the attack of the foot 50 in a downwards direction. As the actuator 32 is further extended and the guide member 28 rotated towards a horizontal position, the telescopic leg 24 commences to rotate about the upper mounting point 52 in a clockwise direction, thereby significantly increasing the attack of the foot 50 in the downwards direction. As a result, and as will be discussed in more detail below, the foot 50 follows a path which initially is predominantly horizontal, and subsequently once the foot 50 has engaged the ground, predominantly vertical.

Once in a deployed position, the telescopic leg 24, the mounting bracket 26 and the member form an A-frame support structure which provides rigidity to the outrigger 22 against horizontal loading which would cause the outrigger 22 to bow.

By providing an axis of rotation of the telescopic leg 24 about the upper mounting point 52 that is offset from the longitudinal axis of the telescopic leg 24, the telescopic leg 24 advantageously attacks and engages the ground at a substantially right or perpendicular angle thereto. Such an engagement by the telescopic leg 24 with the ground at such an angle reduces or eliminates the bending moment to the telescopic leg 24 as the forces are directed substantially along its longitudinal axis and translate into predominately compression forces. The telescopic leg members 34, 36 therefore require less shear strength to resist bending forces as the tube like structure of the telescopic leg 24 is more suited at resisting compressive forces resulting from the angle of attack, thereby reducing or eliminating the requirement for reinforcement and the like. Consequentially, an outrigger 22 comprised of reduced strengthened materials which are lighter and less costly is provided. Additionally, by providing the telescopic leg 24 which engages the ground at a substantially downwards angle of attack, a pair of outriggers 22 provided for on opposite sides of the vehicle act in tandem to provide a vertical lift of the vehicle, while minimally generating horizontal forces which act against each other during the deployment of the telescopic leg 24. Additionally, appropriate selection of the lengths of the various components and the position of the pivot points allows the foot 38 positioned at the end of the telescopic leg 24 to follow a path which initially moves upwards before descending to come into contact with the ground, thereby allowing the foot to clear objects and the like (not shown) which may be positioned adjacent the vehicle and, as will be discussed in more detail below, provide for vehicle stability at a greatly increased range of ground heights.

Figure 6:
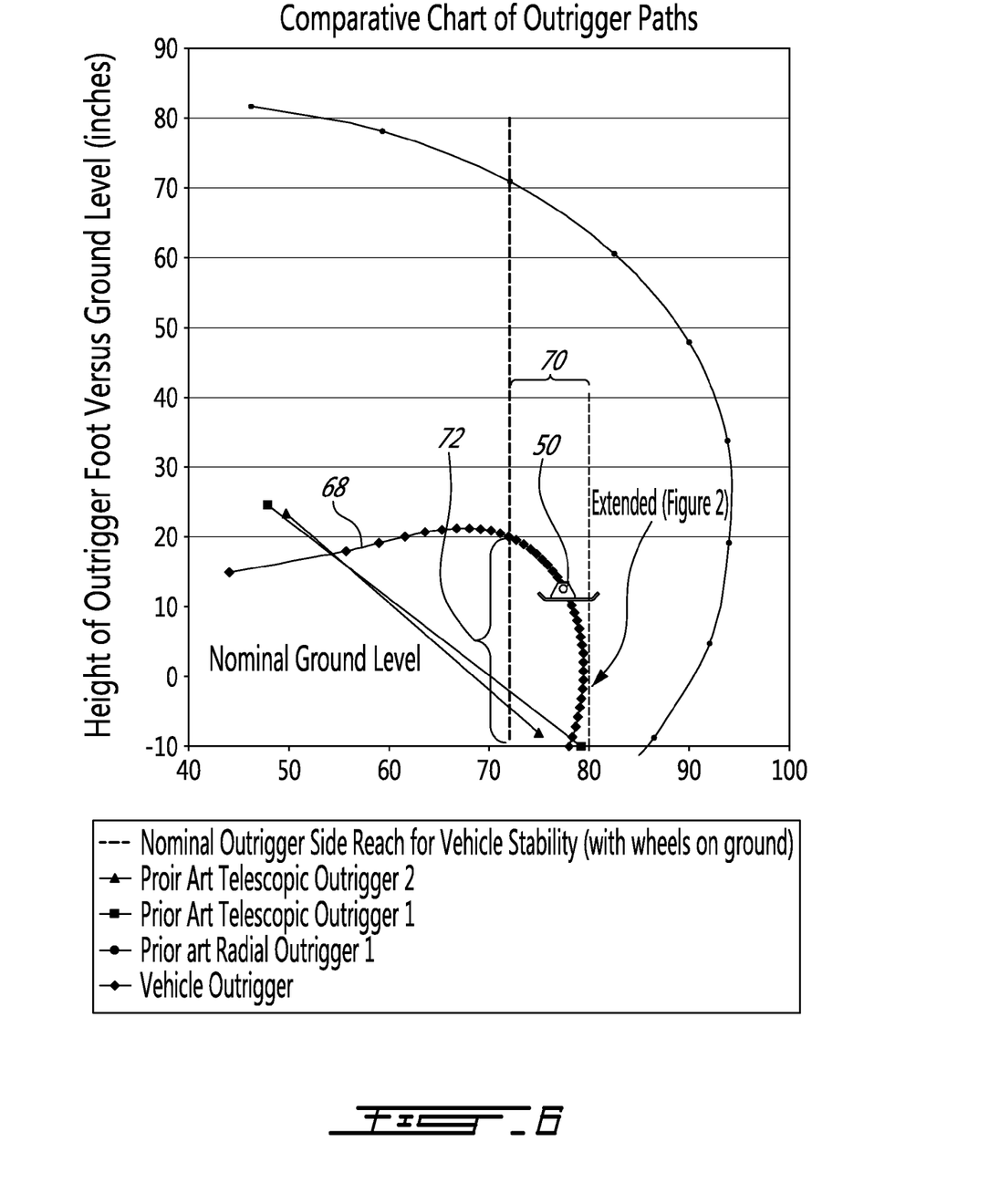
FIG. 6 is a graph illustrating the path of motion of the outrigger foot as the outrigger transitions between a deployed and a stored position.

Referring to FIG. 6, in addition to FIG. 3 and FIG. 5, the path of approach 68 of the foot 50 is illustrated as the telescopic leg 24 is transitioned between a stored position and a deployed position. The positioning of the first flange 56 offset from the longitudinal axis A of the telescopic leg 24 enables the foot 50 to be restricted to a limited horizontal range 70 during descent of the foot 50 while providing a larger vertical motion 72 over such horizontal range 70. The outrigger 22 of the present invention thus advantageously allows the foot 50 to approach the ground at a substantially normal angle therewith and to minimize any bending torque on the telescopic leg 24. Illustratively, for a vertical position 72 displacement of the foot 50, there is a corresponding horizontal displacement 70. Thus, during the final approach of the foot 50 to the ground, the telescopic leg 24 is minimally displaced in the horizontal plane relative to its vertical action. Such an approach reduces the slippage of the outrigger once the foot 50 has engaged the ground as minimal horizontal forces are applied by the outrigger 22 at the deployed position.

Still referring to FIG. 6 and FIG. 3, as discussed above, the outrigger 22 illustratively provides that the foot 50 initially follows a path 68 which includes an upward component before beginning its descent to come into contact with the ground. This improves the range of placement of the foot 50 versus the nominal ground height (illustratively, the point at which the tires of the vehicle contact the ground) allowing the outrigger 22 to clear objects otherwise in its path and/or allowing the vehicle to be used on unlevel ground and the like while maintaining the requisite stability of the vehicle. In this regard, the distance from the centre of the vehicle at which the foot 50 engages the ground and is considered as providing enough stability is determined by the weight of the vehicle, the equipment being supported by the vehicle, etc.

Referring now to FIG. 4 in addition to FIG. 6 the outrigger 22 of the present invention would typically be installed such that horizontal extension of the outrigger 22 can be obtained while the foot 50 remains at least several inches above a nominal ground level and can be subsequently extended in a vertical direction several inches below the nominal ground level in order to provide stability in the presence of uneven or soft ground conditions.

Still referring to FIG. 6, comparison with other prior art telescoping outriggers reveals the range of operation where the vehicle is stable to be much greater than those prior art designs.

Although the present invention has been described hereinabove by way of specific embodiments thereof, it can be modified, without departing from the spirit and nature of the subject invention defined in the appended claims.

We claim:

1. A stabilized wheeled service vehicle comprising:
    a chassis;
    an extendable servicing equipment attached to an upper surface of said chassis via a rotatable turntable;
    a system of actuators for raising, lowering, extending and rotating a telescoping boom; and
    at least one pair of independently extendable outriggers, each outrigger of said pair mounted on a respective side of said chassis in an opposed relationship, each outrigger comprising a telescopic leg assembly comprising a first telescopic member and a second telescopic member slidably overlapping and extending outwardly from said first telescopic member along a longitudinal axis, an actuator housed within said telescopic leg assembly for slidably extending or retracting said first telescopic member versus said second telescopic member along said longitudinal axis, a footing at an outer end of said second telescopic member, a mounting bracket for connection to the chassis comprising an upper mounting point and a lower mounting point offset horizontally from said upper mounting point, a first flange extending from said first telescopic member and pivotally mounted to said upper mounting point at a point offset from said longitudinal axis and an elongate linkage pivotally attached between said lower horizontally offset mounting point and a pivot point on said second telescopic member;
    wherein when said telescopic leg is extended away from said chassis, a distance between said lower mounting point and said upper mounting point remains greater than a distance between said lower mounting point and said pivot point on said second telescopic member and said foot follows a path comprising an initial extending part comprising a horizontal component and no downward component followed by a subsequent ground engagement part wherein said foot engages the ground while moving downwards at an angle substantially normal to the ground.

2. The stabilized service vehicle of claim 1, comprising two pairs of said outriggers, a first of said pairs positioned towards a rear of said vehicle chassis behind said rotatable turntable and a second of said pairs positioned towards a front of said vehicle chassis in front of said rotatable turntable.

3. The stabilized service vehicle of claim 1, wherein a given one of said at least one pair of outriggers further comprises a torsion bar, said torsion bar interconnecting each outrigger of said given pair of outriggers.

4. The stabilized service vehicle of claim 1, wherein said system of actuators comprises a plurality of pistons, a source of hydraulic fluid under pressure and a controller for selectively applying said hydraulic fluid to said pistons in order to one of raise, lower, extend or rotate said telescoping boom.

5. The stabilized service vehicle of claim 1, wherein said extendable servicing equipment comprises an aerial work platform.

6. The stabilized service vehicle of claim 5, wherein said aerial work platform is selected from a group comprising a boom lift, a basket crane and a hydraladder.

7. The stabilized service vehicle of claim 1, wherein said linkage is of a fixed length.

* * * * *